United States Patent
Purushothman et al.

(10) Patent No.: US 9,459,174 B1
(45) Date of Patent: Oct. 4, 2016

(54) BELLOWS LEAKAGE TESTER AND METHODS FOR TESTING BELLOWS

(71) Applicant: WD Media, LLC, San Jose, CA (US)

(72) Inventors: Ganesen Purushothman, Penang (MY); Fadzli B. Idris, Penang (MY)

(73) Assignee: WD Media, LLC, San Jose, CA (US)

( * ) Notice: Subject to any disclaimer, the term of this patent is extended or adjusted under 35 U.S.C. 154(b) by 389 days.

(21) Appl. No.: 14/145,200

(22) Filed: Dec. 31, 2013

Related U.S. Application Data

(60) Provisional application No. 61/879,235, filed on Sep. 18, 2013.

(51) Int. Cl.
*G01M 3/02* (2006.01)

(52) U.S. Cl.
CPC ..................................... *G01M 3/02* (2013.01)

(58) Field of Classification Search
CPC ...... G01M 3/02; G01M 3/022; G01M 3/027; G01M 3/227; G01M 3/26; G01M 3/2846; G01M 3/2853; F16K 37/00; F16K 41/10; Y10T 137/8326
See application file for complete search history.

(56) References Cited

U.S. PATENT DOCUMENTS

| | | | |
|---|---|---|---|
| 2,691,773 A * | 10/1954 | Lichtenberger | F16K 37/00 137/312 |
| 2,693,822 A * | 11/1954 | Gerow | F16K 31/122 137/15.11 |
| 3,583,239 A * | 6/1971 | Paine | G01M 3/022 73/49.8 |
| 4,379,743 A | 4/1983 | Nakatsukasa et al. | |
| 4,522,697 A | 6/1985 | Dimock et al. | |
| 4,523,985 A | 6/1985 | Dimock | |
| 4,911,810 A | 3/1990 | Lauro et al. | |
| 4,911,815 A | 3/1990 | Kamei et al. | |
| 4,961,273 A * | 10/1990 | Fay | F26B 5/06 34/92 |
| 5,251,471 A * | 10/1993 | Minten | G01M 3/26 73/40 |

\* cited by examiner

*Primary Examiner* — Daniel S Larkin
*Assistant Examiner* — Jamar Ray
(74) *Attorney, Agent, or Firm* — Loza & Loza, LLP; Gabriel Fitch

(57) ABSTRACT

Various aspects of the present invention provide a testing apparatus and methods for testing a bellows of a sputter machine for air leakage. One such testing apparatus is configured to simulate conditions of the sputter machine and thereby test a bellows for air leakage in both a compressed and an uncompressed configuration. Accordingly, a bellows can be ensured to be in satisfactory working condition before it is installed in the gate valve assembly and also tested for air leakage after removal from the gate valve assembly.

8 Claims, 11 Drawing Sheets

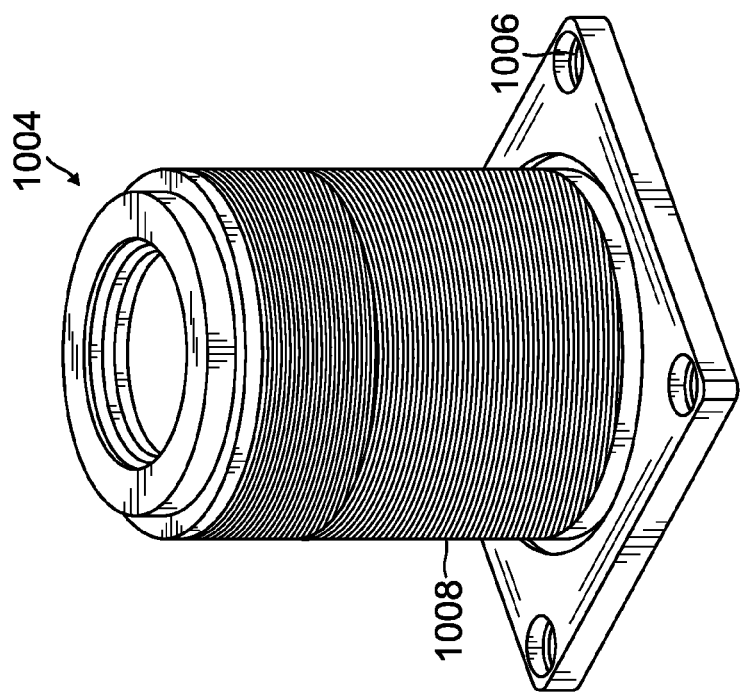
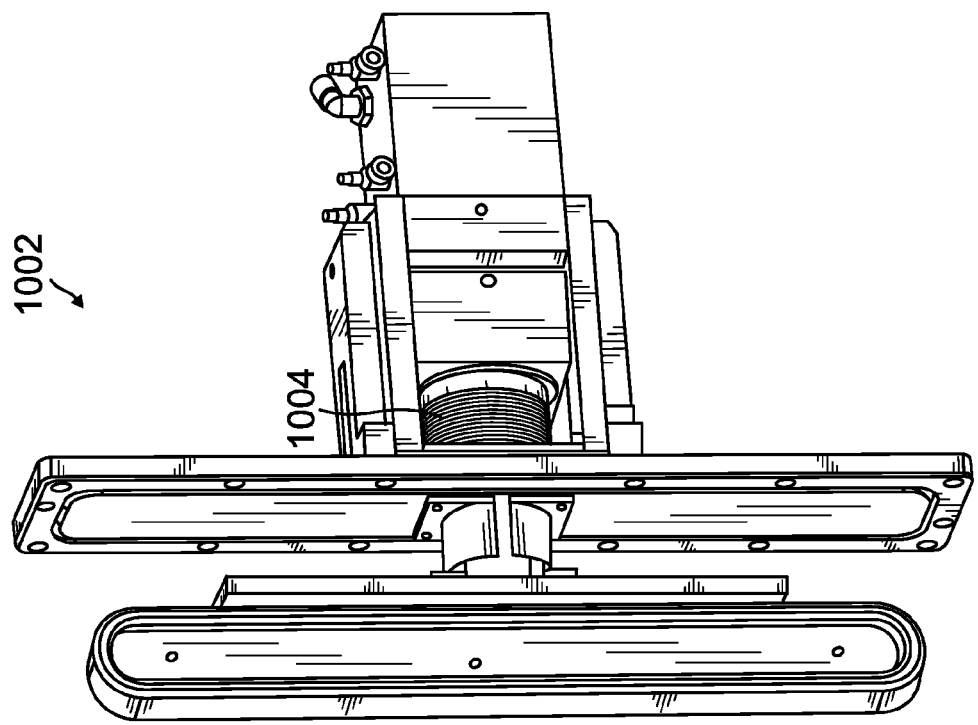

BELLOWS LEAKAGE TESTER AND METHODS FOR TESTING BELLOWS

CROSS-REFERENCE TO RELATED APPLICATION(S)

This application claims priority to and the benefit of U.S. Provisional Application No. 61/879,235 filed on Sep. 18, 2013 and entitled, "LEAKAGE TESTER FOR BELLOWS," the entire content of which is incorporated herein by reference.

FIELD

Aspects of the present invention relate to a bellows of a gate valve assembly for a sputtering machine, and more specifically to leakage testing of a bellows of the gate valve assembly.

BACKGROUND

A bellows 1004 is a component used in a gate valve (GV) assembly 1002 of a sputtering machine 1000 (see FIGS. 10a, 10b, 10c). In the sputtering machine, the bellows moves together with a GV actuator shaft in both forward and reverse directions in accordance with vacuum pressure. The sputtering machine is often used in the manufacturing of media disks used for magnetic recording. The sputtering machine may have a number of process chambers (e.g., about twenty to twenty-four chambers) where carrier holders (for holding disks or substrates) are transferred from one chamber to another chamber to enable the disks to be sputtered. Each carrier holder will go in and out of each chamber and generally stop for a few seconds in each chamber during the process flow to complete one cycle. When a carrier holder stops in a chamber, the GV assemblies close both ends of the chamber. When both ends of the chamber are closed, the environment inside the chamber may be kept in a vacuum condition which allows the sputtering process to begin. In each of the chambers, there may be a cathode that will sputter the target material onto the disk.

The GV assembly is used to provide separation between adjacent process chambers of a sputtering machine to ensure that the respective sputtering processes for each individual chamber remain separate. This is achieved when the GV assembly extends its actuator shaft to close the opening between the chambers and compress the bellows. The bellows is an elastic component (e.g., an elastic metallic vessel) that can be compressed or extended under vacuum pressure. When the vacuum pressure is released, the compressed bellows will return to its original uncompressed shape. In the sputtering machine, the bellows protects the inside environment of the process chamber from being exposed to the outside environment (e.g., atmosphere environment). If the bellows is found to have a leak, the bellows needs to be replaced. However, detecting a leak in the bellows of a sputter machine can involve complicated and time consuming test processes.

BRIEF DESCRIPTION OF THE DRAWINGS

FIG. 10b is a schematic perspective view of the GV assembly of FIG. 10a with a bellows.

FIG. 10c is a schematic perspective view of the bellows of FIG. 10b.

DETAILED DESCRIPTION

Various embodiments of the present invention are directed to an apparatus and methods for testing a bellows for leakage. Therefore, the condition of a bellows can be determined before installing the bellows within a gate valve (GV) assembly of a sputtering machine and also after removing the bellows from the GV assembly. A bellows is considered to be in a substantially perfect working condition when no effective leakage can be detected when the bellows is in a compressed or an uncompressed position.

In several embodiments, a bellows leakage tester is provided and configured to determine a bellows' condition (leaking or not leaking) and identify the leakage location of the bellows if the bellows is leaking. The bellows leakage tester can be operated in at least two test modes including a static mode and a compressed mode. In the static test mode, the bellows is tested in an uncompressed position. In the compressed test mode, the bellows is tested in a compressed position. Examples for using the bellows leakage tester in the static test mode and the compressed test mode will be described in detail below.

Figure 1:
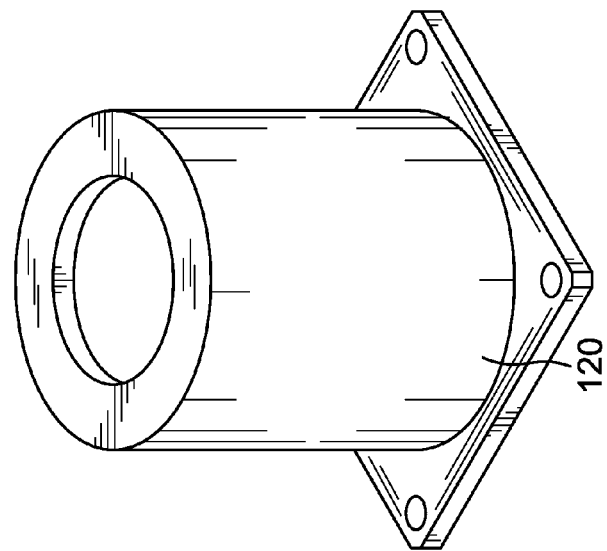
FIG. 1 is a schematic perspective view of a bellows leakage tester and a bellows cover in accordance with one embodiment of the invention.
Figure 1:
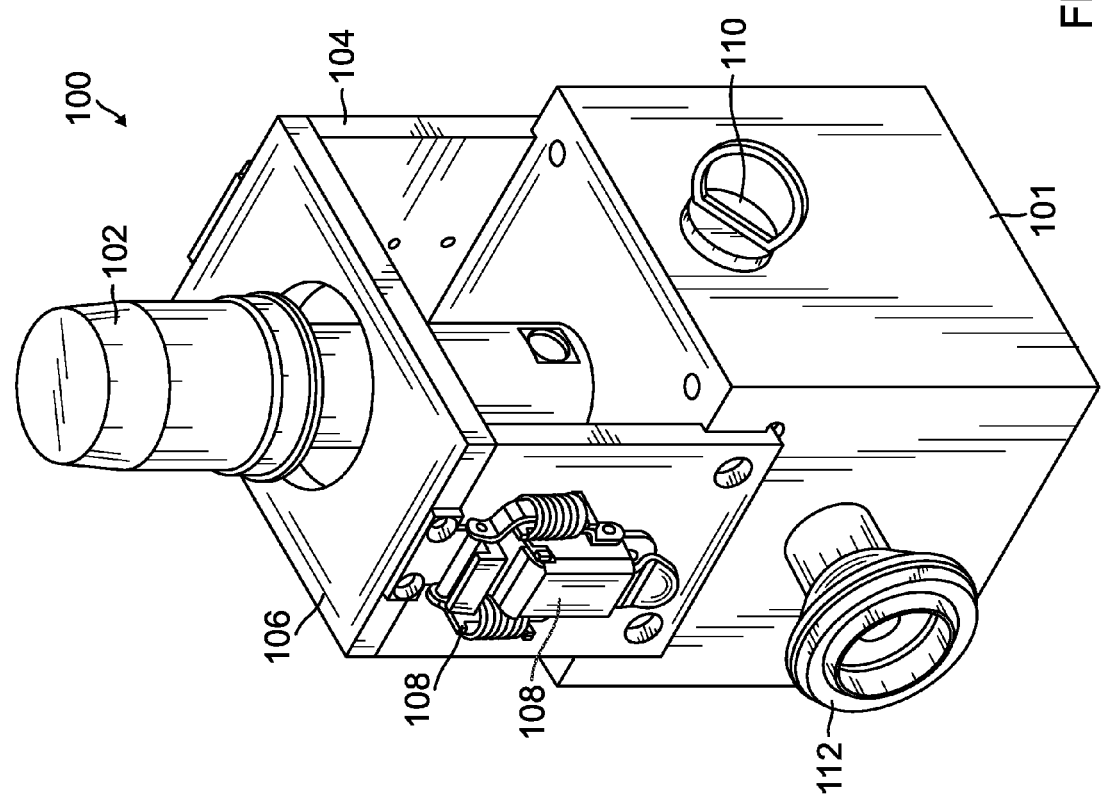

FIG. 1 is a schematic perspective view of a leakage tester 100 for a bellows and a bellows cover 100 in accordance with one embodiment of the invention. Referring to FIG. 1, the leakage tester 100 has a base 101, and a shaft (e.g., a modified actuator shaft) 102 that extends from a top side of the base 101 in a vertical direction (the axial direction of the shaft 102). Two side plates 104 extend from opposite sides of the base 101 in the vertical direction. In some embodiments, the side plates 104 may be secured to the base 101 by any suitable fasteners such as bolts, screws, studs, retaining pins, rivets, etc. In other embodiments, the side plates 104 may be an integral part of the base 101 or welded to the base 101. A top compression plate 106 is placed on the side plates 104 in a substantially horizontally position. The top compression plate 106 can be removably secured to the side plates 104. Therefore, the side plates 104 extend from the top side of the base 101 to the top compression plate 106. In the exemplary embodiment shown in FIG. 1, the top compression plate 106 may be secured to the side plates 104 with a hook and latch mechanism 108. A retaining shaft 110 is provided for retaining the actuator shaft 102, for example, in one of at least two selectable positions (e.g., openings) along the vertical axis of a bottom portion of the actuator shaft 102. The retaining shaft 110 can be inserted through a hole of the base 101 and extended to one of the at least two selectable positions/openings on the bottom portion of the actuator shaft 102. An air outlet or exhaust 112 is located on a side of the base 101, which will be described in more detail below. It should be appreciated that the relative positions (e.g., top, bottom, left, right, front, and back, etc.) of the described features of the leakage tester 100 are not limiting in nature, but chosen for the ease of reference.

In one configuration, the leakage tester 100 may be used to test a bellows for leakage in the static mode in which is the bellows is positioned in a way similar that of a GV assembly in a refracted position. In this case, the bellows is not compressed.

Figure 2:
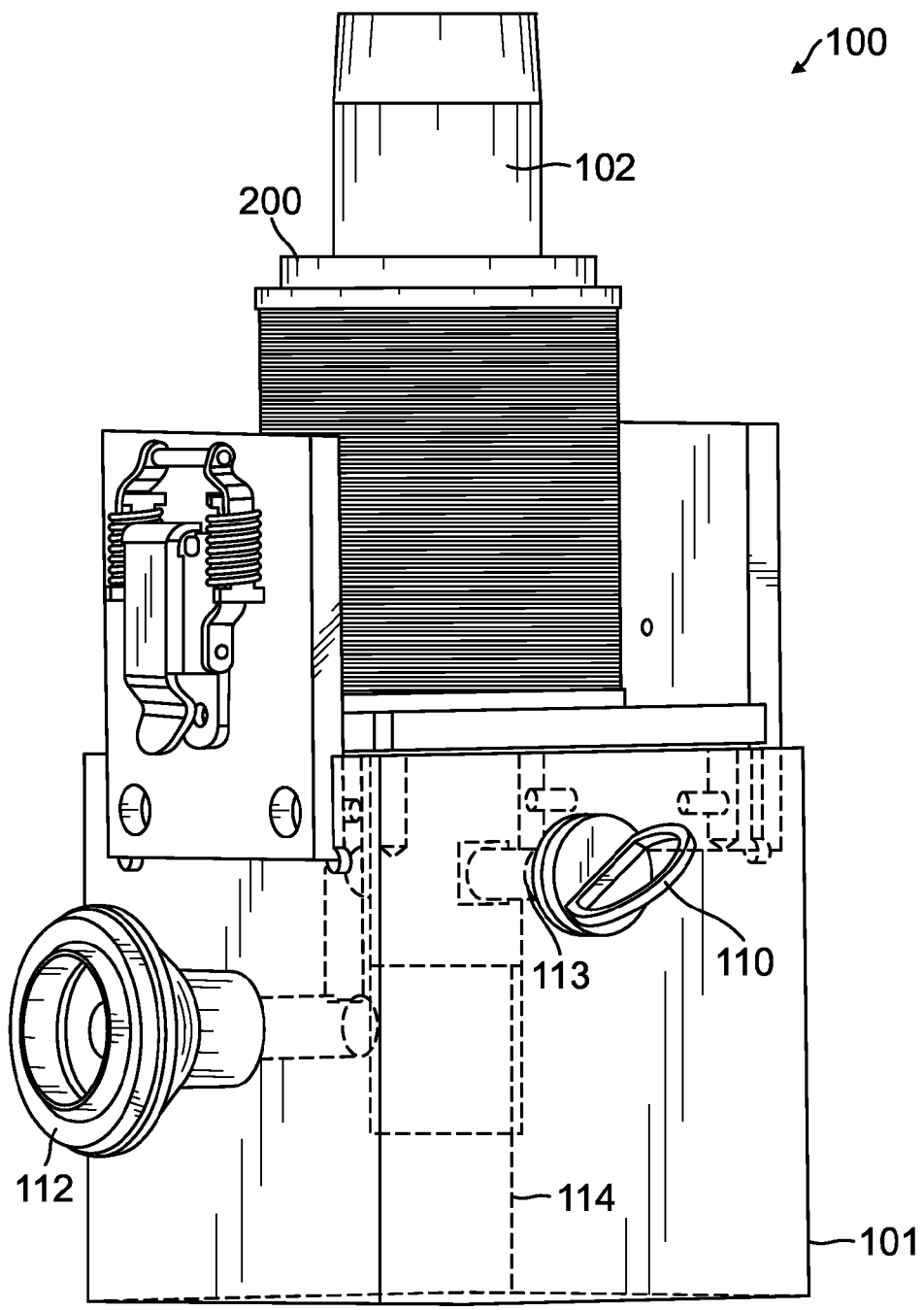
FIG. 2 is a schematic perspective view of a bellows leakage tester and a bellows under test in a static mode test in accordance with one embodiment of the invention.

FIG. 2 is a schematic perspective view of the leakage tester 100 configured for testing a bellows 200 in a static mode test in accordance with one embodiment of the invention. A process for testing a bellows 200 in the static mode will be described in detail below in reference to FIGS. 3 and 4. In one embodiment, the process can place the bellows 200 under test in effectively the same uncompressed position as it exists in a GV assembly when the shaft is retracted with no applied pressure. In this configuration, a technician operating the bellows leakage tester 100 will be able to determine the leakage location, if any, on the bellows 200. For example, the leakage location may be on the O-ring sealing area or on the bellows pitch of the bellows 200.

Figure 3:
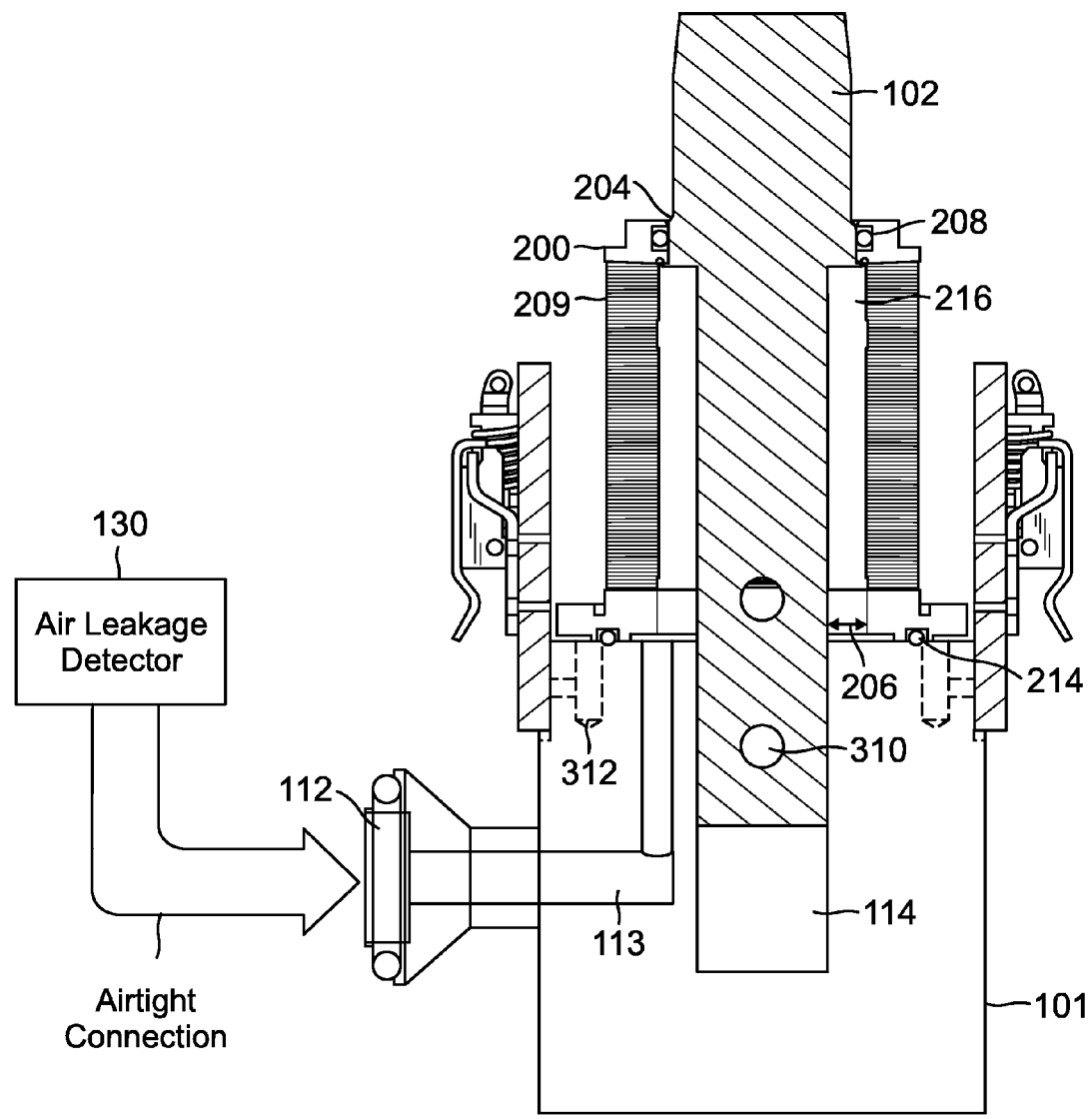
FIG. 3 is a schematic side cross sectional view of a bellows leakage tester and a bellows under test in the static mode test in accordance with one embodiment of the invention.

FIG. 3 is a schematic side cross sectional view of the leakage tester 100 for testing the bellows 200 in the static mode test in accordance with one embodiment of the invention. The bellows 200 has a cylindrical shape with a first opening (e.g., top opening) 204 and a second opening (e.g., bottom opening) 206 positioned at opposite ends of the bellows. The bellows 200 further includes a first O-ring seal (e.g., top O-ring seal) 208 proximate the first opening 204 and configured to make an airtight seal between the bellows 200 and the shaft 102. The bellows also includes a second O-ring seal (e.g., bottom O-ring seal) 214 proximate the second opening 206 and configured to make an airtight seal between the bellows 200 and a top surface of the base 101. The body of the bellows 200 has a pitch area 209 that has a suitable flexibility such that the bellows 200 may be compressed or uncompressed (expand) under a vacuum pressure in at least one direction (e.g., an axial direction). The shaft 102 is configured to receive the bellows 200 in an axial direction (e.g., vertical direction in the figure) of the shaft 102. More specifically, the shaft 102 passes through the first/top opening 204 and the second/bottom opening 206. The shaft 102 extends upward from the top surface of the base 101 and holds the bellows 200 in a vertical position such that the shaft 102 and the bellows 200 are substantially concentrically arranged. The shaft 102 has a portion configured to engage the first O-ring seal 208 that is proximate or close to the first opening 204 of the bellows. Other features shown in FIG. 3 will be described in more detail below in reference to the flowcharts of FIGS. 5, 7, 8, and 9.

Figure 4:
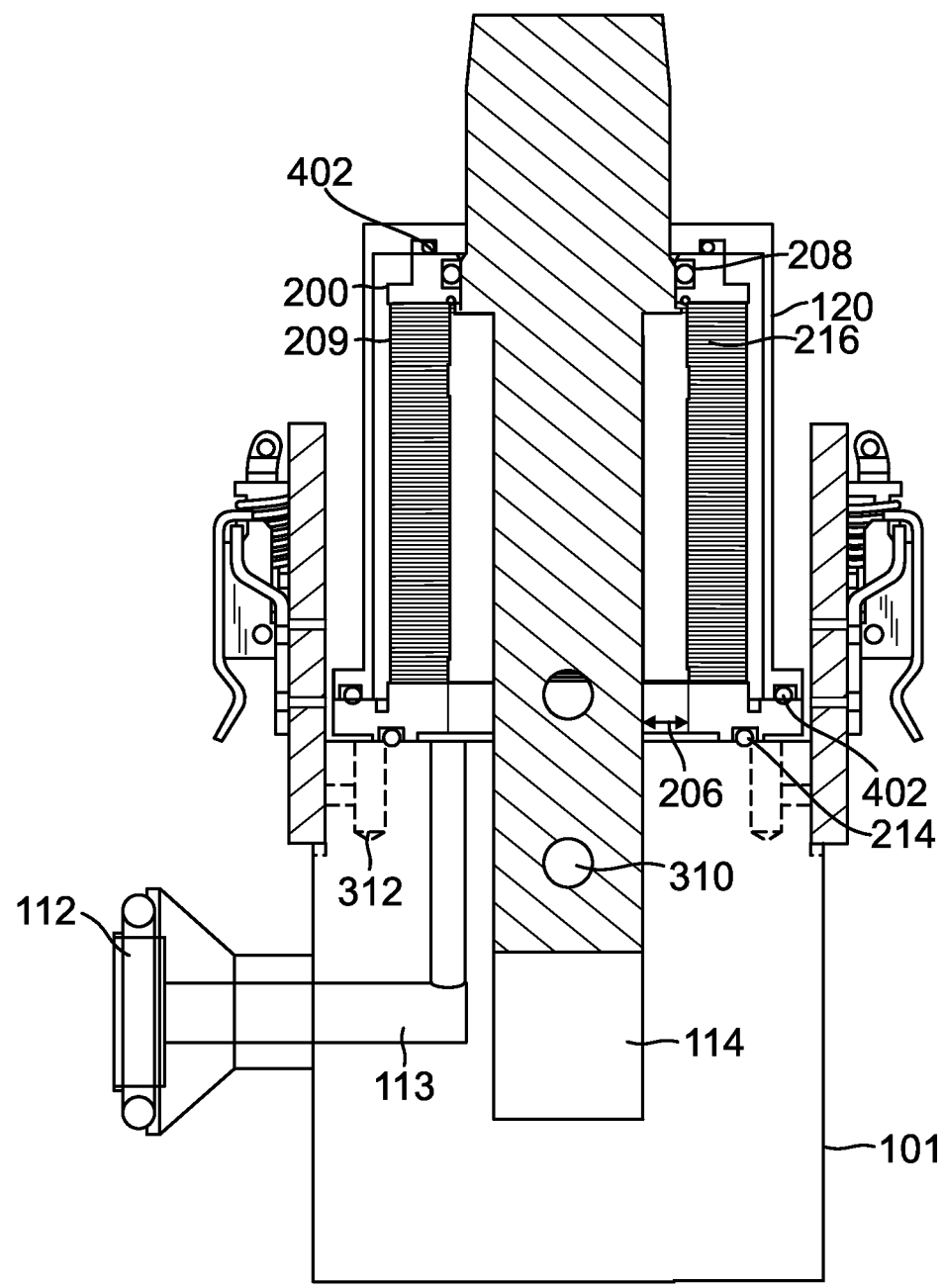
FIG. 4 is a schematic side cross sectional view of a bellows leakage tester and a bellows under test in the static mode using a bellows cover in accordance with one embodiment of the invention.

FIG. 4 is a schematic side cross sectional view of the leakage tester 100 for testing a bellows in the static mode under a vacuum condition using a bellows cover 120 installed in accordance with an embodiment of the invention. The leakage tester 100 shown in FIG. 4 is substantially the same as the one shown in FIG. 3 except the addition of the bellows cover 120. The bellows cover 120 functions as a shield to make sure the whole bellows body is in vacuum condition. To be more specific, the bellows cover 120 encloses, in conjunction with the top side of the base 101, the pitch area 209 of the bellows while purposely not enclosing the O-ring seals 208 and 214 of the bellows. The bellows cover 120 acts as an airtight barrier for the enclosed pitch area 209 and has seals 402 located at top and bottom ends for providing airtight sealing at both ends of the bellows 200. Therefore, the bellows pitch area 209 itself can be kept in a vacuum condition to facilitate the detection of a leak in any of the O-ring seals 208 and 214. In this configuration, any leakage, if detected, will have been caused by a leaky O-ring seal. As shown in FIG. 4, the bellows cover 120, the bellows 200, and the shaft 102 are concentrically arranged with the shaft positioned substantially at the center of the bellows.

Static Mode Test

In several embodiments, a bellows leakage test in the static mode can be performed in using a bellows leakage tester (e.g., such as those depicted in FIGS. 1 to 4) and the testing processes as described below.

Figure 5:
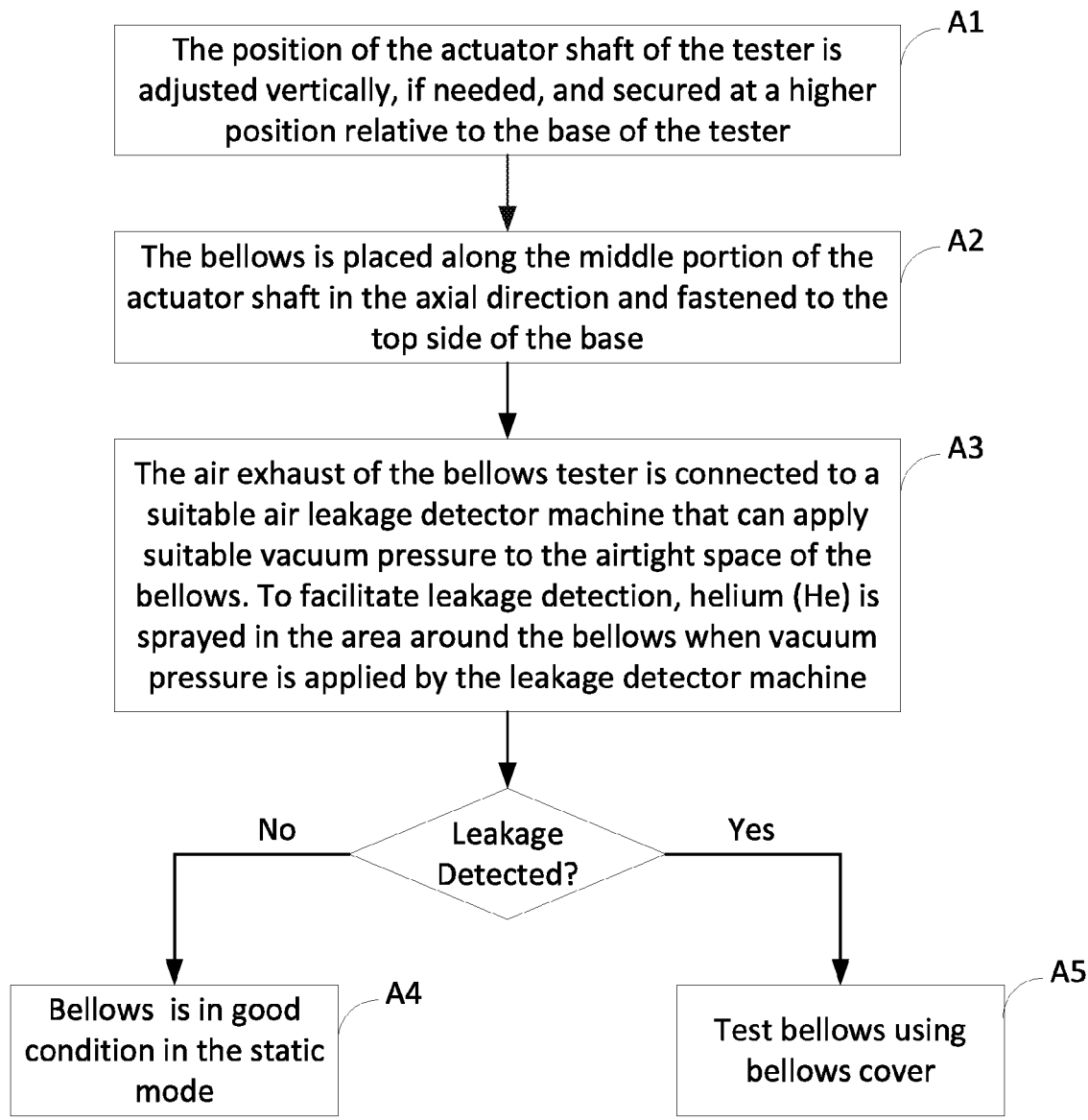
FIG. 5 is a flowchart illustrating a process for performing a static mode test for testing a bellows in accordance with an embodiment of the invention.

FIG. 5 is a flowchart illustrating a static mode test for testing a bellows in accordance with an embodiment of the present invention. Referring now to FIGS. 3 and 5, in block A1, the position of the shaft 102 of the leakage tester 100 is adjusted vertically (axial direction), if needed, and secured at a higher position relative to the base 101 of the tester. The base 101 has an opening 114 on the top side for receiving an end portion of the shaft 102 in the axial direction. The higher position allows the bellows 200 to be tested in a static mode (uncompressed). This position can be fixed by inserting the retaining shaft 110 (see FIG. 2) through a hole 113 (see FIG. 2) of the base 101 and then into a lower hole 310 (see FIG. 3) of two or more holes in the end portion of shaft 102.

In block A2, the bellows 200 is placed over the middle portion of the shaft 102 in the axial direction and fastened to the top side of the base 101 using, for example, one or more screws 312 (e.g., four cap M6 type screws). The screws 312 go into respective holes located at the corners of the bellows 200. In some embodiments, other types of fasteners may be used. The O-ring seal 208 (e.g., a vacuum seal gland) positioned near the bellows' top end/opening 204 should be seated properly (e.g., perfectly fit) onto the shaft 102 (see FIG. 3). Therefore, the O-ring seal 208 can provide an airtight seal between the top opening 204 of the bellows and the shaft 102, provided that the seal is not defective. The top side of the base 101 engages a second O-ring seal 214 that is proximate or close to the bottom opening 206 of the bellows. The second O-ring seal 214 facilitates an airtight seal between a bottom surface of the bellows 200 and the top side of the base 101 such that an airtight space 216 is formed inside the bellows 200 between the top (first) O-ring seal 208 and the bottom (second) O-ring seal 214. A volume of the airtight space 216 may be changed by moving the shaft 102 in the axial direction. For example, moving the shaft 102 up will increase the volume of the airtight space 216, but moving the shaft 102 down will decrease the volume.

In block A3, the air exhaust 112 of the bellows tester 100 is coupled to a suitable air leakage detector 130 (see FIG. 3) that can apply a suitable vacuum pressure (e.g., constant vacuum pressure) to the airtight space 216. The air leakage detector 130 can be any air leakage detector or the like, including those that are well known in the industry. An air conduit 113 extends from the air exhaust 112 through the base 101 and to the airtight space 216, and effectively forms a part of an airtight connection between the airtight space 216 and the air leakage detector 130. To facilitate leakage detection, an identifiable gas such as helium (He) may be sprayed in the area proximate the bellows (e.g., particularly near the O-ring seal areas) when the air leakage detector 130 applies a vacuum pressure to the airtight space 216 via the air conduit 113. The identifiable gas is used as a marker to assist in leakage detection. In other embodiments, suitable identifiable gases other than He may be used as the marker.

In block A4, if no air leakage is detected by the air leakage detector 130 in the static mode test, it indicates that the bellows 200 is in a satisfactory condition (i.e., no detected air leakage) in the static mode. However, if air leakage is detected in the static mode test, then a procedure described below can be used to find the location of the leakage on the bellows 200 (e.g., at the O-ring seals or the bellows pitch area). In block A5, to find the location of the leakage on the bellows 200, the bellows cover 120 can be used (see FIGS. 1 and 4) to isolate the location of the leakage as between the O-rings or the bellows pitch area. The bellows cover 120 functions as a shield to make sure the whole bellows body is in vacuum condition. To be more specific, the bellows cover 120 encloses, in conjunction with the top side of the base 101, the pitch area 209 of the bellows while not enclosing the O-ring seals 208 and 214. The bellows cover 120 acts as an airtight barrier for the enclosed pitch area and has seals 402 located at top and bottom ends for providing airtight sealing at both ends of the bellows 200. Therefore, the bellows pitch 209 itself can be kept in a vacuum condition to facilitate the detection of a leak in any of the O-ring seals 208 and 214. In this configuration, any leakage, if detected, will have been caused by a leaky O-ring seal. The bellows cover 120, the bellows 200, and the shaft 102 are concentrically arranged with the shaft positioned substantially at the center of the bellows.

With the bellows cover 120 installed, similar to the procedures illustrated in blocks A1 to A3, the air leakage detector is operated to apply a vacuum pressure to the bellows 200 through the air exhaust 112, while an identifiable gas (e.g., helium) is sprayed near the O-ring sealing area. If no air leakage is detected by the air leakage detector, it can be concluded that the previously detected air leakage (without using the bellows cover 120) is caused by a leak on the bellows pitch 209. As such, the defective bellows can be scrapped and replaced with a new bellows. However, if a leak is detected, it indicates that the air leakage has occurred at one of the O-ring sealing areas. In this case, new O-ring seals may be installed to replace the old O-ring seals 208 and 214. Then, the testing procedures of blocks A1 to A3 are repeated. If no air leakage is detected in the static mode test, the bellows 200 will be tested for air leakage in a compress mode test to be described in detail below.

Compress Mode Test

Figure 6:
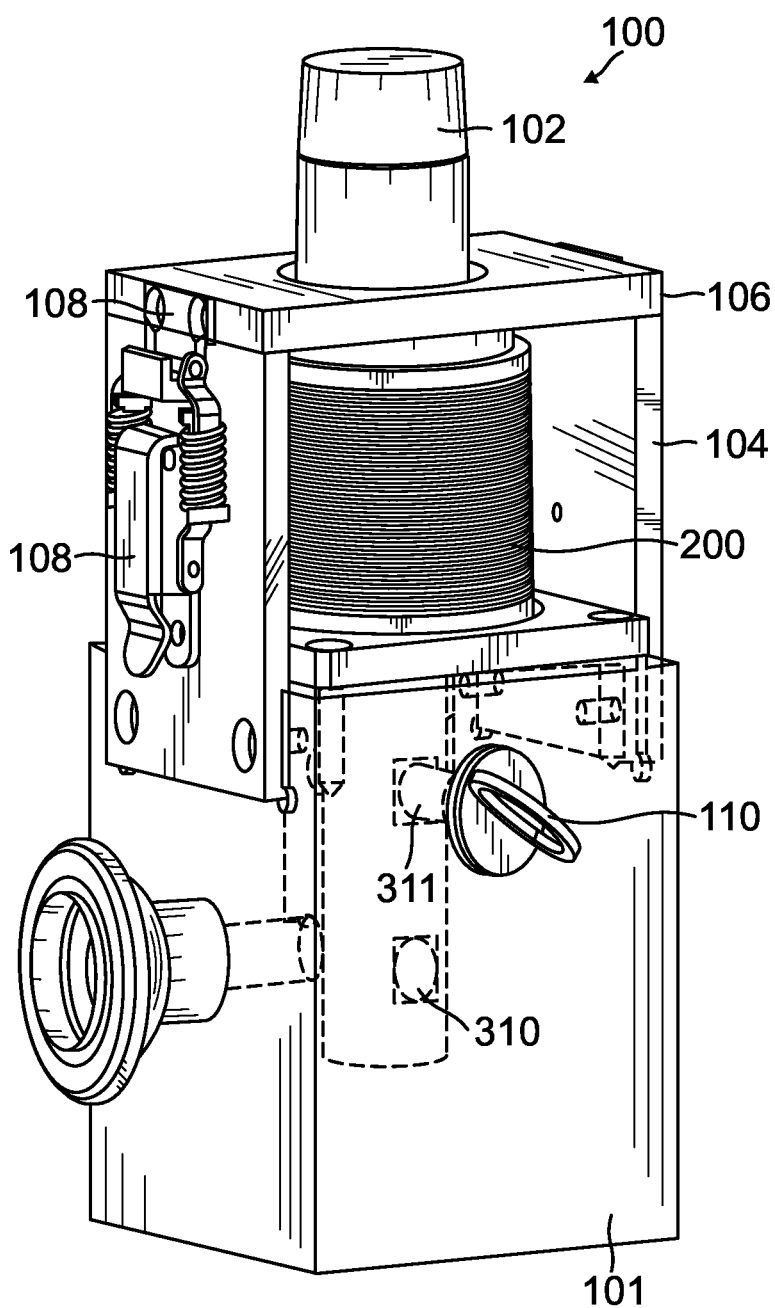
FIG. 6 is a schematic perspective view of a bellows leakage tester and a bellows under test in a compressed mode test in accordance with one embodiment of the invention.

FIG. 6 is a schematic perspective view of the leakage tester 100 configured for testing the bellows 200 in a compressed mode test in accordance with one embodiment of the invention.

Figure 7:
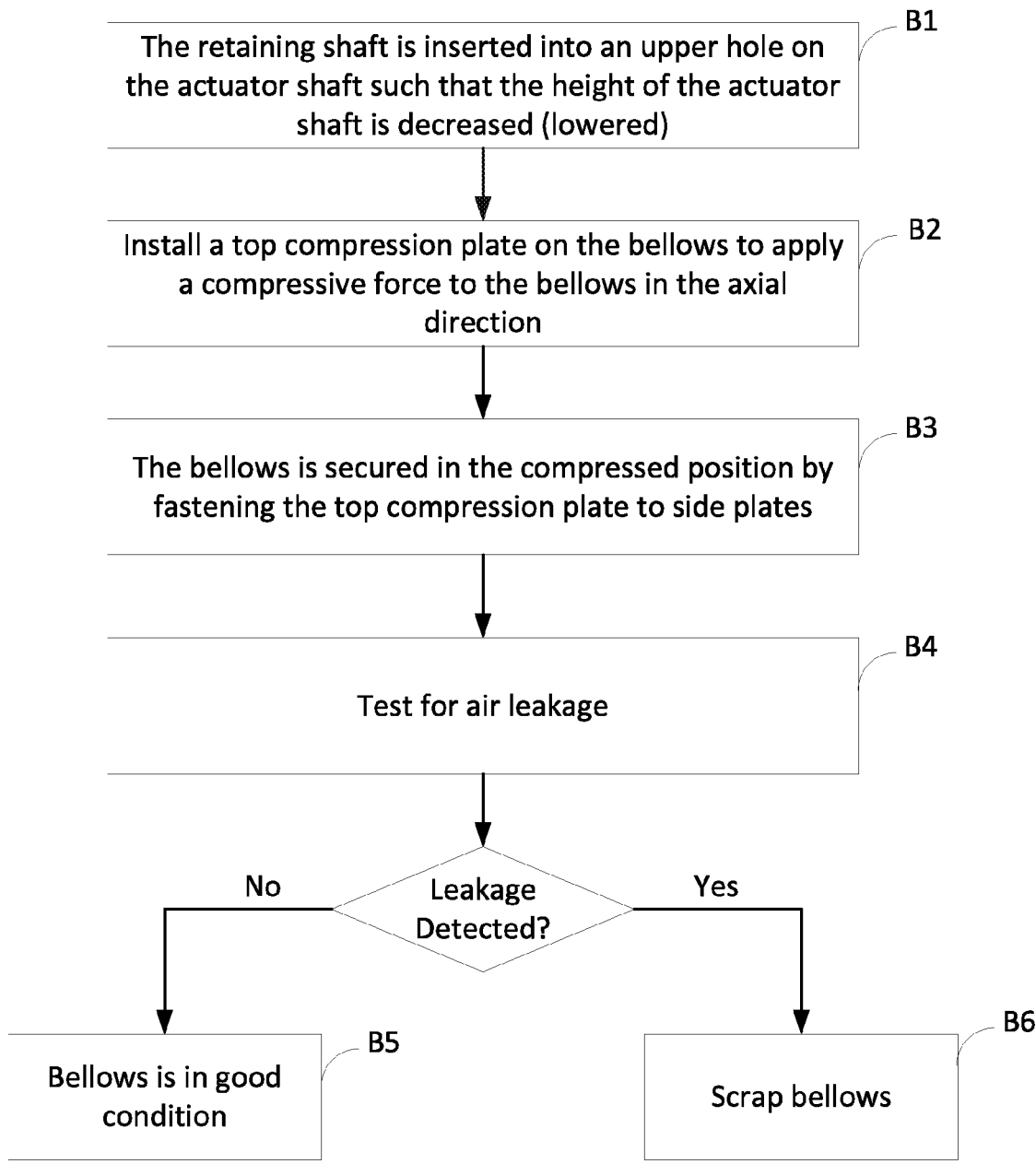
FIG. 7 is a flowchart illustrating a process for performing a compress mode test for testing a bellows in accordance with one embodiment of the invention.

FIG. 7 is a flowchart illustrating a compress mode test for testing a bellows in accordance with one embodiment of the invention. In this example, it is assumed that the bellows 200 is already installed on the leakage tester 100 as illustrated in FIG. 3. Referring now to FIGS. 6 and 7, in block B1, the retaining shaft 110 is inserted into an upper hole 511 (see FIG. 6) on the shaft 102 through a hole of the base 101. The retaining shaft 110 may be relocated to the upper hole 311 from the lower hole 310, which was used in the static mode test described above. By performing this procedure, the height of the shaft 102 is decreased (lowered) relative to that of the static mode test. In order to insert the retaining shaft 110 into the upper hole 311, the upper hole 311 is aligned with the hole 113 of the base 101 such that the holes are substantially aligned (e.g., concentric) with each other. Then, the retaining shaft 110 can be inserted into both holes to secure the axial position (e.g., vertical position) of the shaft 102. At this time, the bellows 200 can be pressed down (compressed) as well to its compressed position.

In block B2, in order to maintain the bellows 200 in the compressed position, a top compression plate 106 is installed on the bellows 200 to apply a compressive force to the bellows 200 in the axial direction. In the example shown in FIG. 6, the compression plate 106 and the top side of the base 101 are respectively in contact with the opposite ends of the bellows 200, and retain the bellows in the compressed position by applying compressive forces to the bellows in the axial direction (vertical direction in FIG. 6). The top compression plate 106 has a hole suitably sized such that the shaft 102 can extend therethrough until the bottom of the top compression plate 106 touches or contacts the bellows' top surface. The top compression plate 106 may be removably secured to the side plates 104 with any suitable fasteners such as a hook and latch mechanism 108 shown in the figures. Respective parts of the hook and latch mechanism 108 may be attached to the side plate 104 and top compression plate 106 by any suitable methods. In some embodiments, the hook and latch mechanism 108 may be secured by fasteners such as bolts, screws, studs, retaining pins, rivets, etc. In other embodiments, the hook and latch mechanism 108 may be secured by welding or adhesive.

In block B3, the bellows 200 is secured in the compressed position by fastening the top compression plate 106 to the side plates 104 extending from the base 101. For example, the latch mechanism 108 may include spring latches (or other suitable fasteners such as quick release fasteners) installed on the respective side plates 104, and the spring latches are configured to engage respective hooks positioned on opposite edges of the top compression plate 106. Once the hooks and latches are in a locked position, the bellows 200 is secured in the compressed position.

In block B4, an air leakage test similar to the test described in blocks A1 through A3 of FIG. 5 is performed to check for air leakage on the bellows 200. If no leakage is found, then the bellows 200 is in satisfactory working condition for general use and may be installed in the GV assembly in block B5. However, if an air leakage is detected, then the bellows 200 is defective and will be scrapped in block B6. In such case, an operator can replace the defective bellows with a new bellows and repeat the static mode test and compress mode test as described above to test the new bellows.

The above described embodiments of the offline leakage tester 100 can test a bellows offline to determine its condition before the bellows is installed in a GV assembly. Therefore, the offline leakage tester and testing methods of the present invention can save valuable time currently spent on determining the condition of the bellows after it has already been installed in a GV assembly. More specifically, the offline bellows tester 100 can identify the leaky location (e.g., pitch area or O-ring seal) on the bellows.

Figure 8:
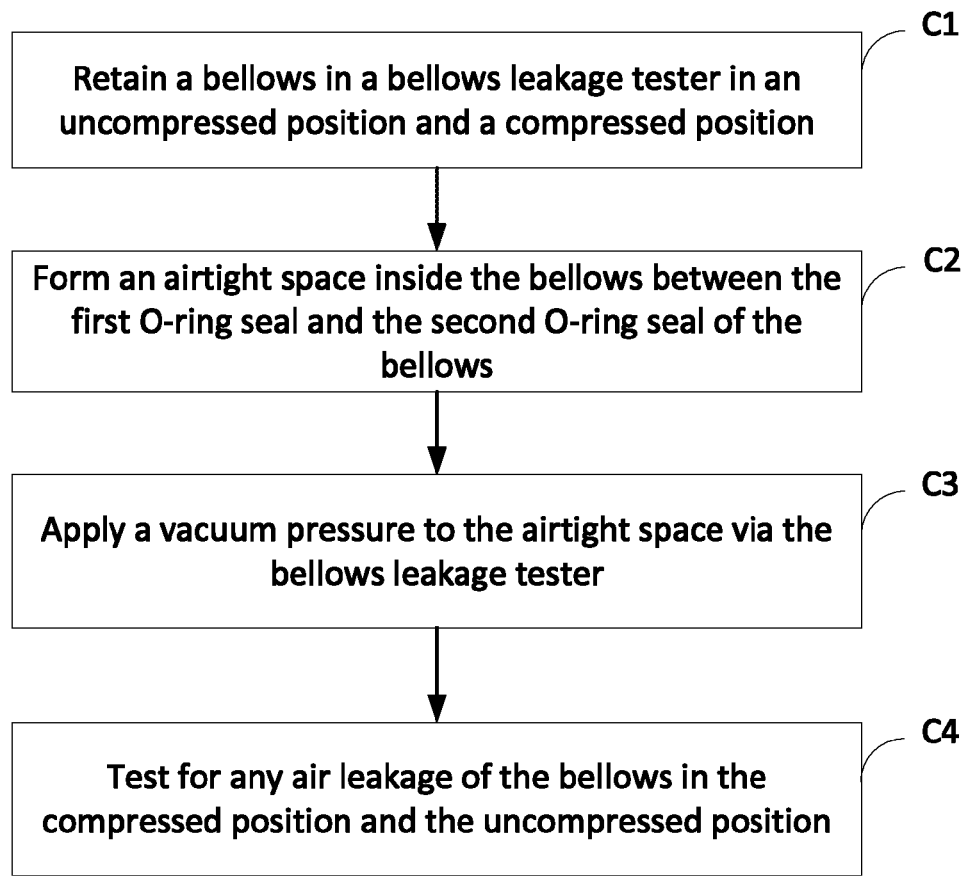
FIG. 8 is a flowchart illustrating a method for testing for air leakage of a bellows in accordance with an embodiment of the invention.

FIG. 8 is a flowchart illustrating a method for testing air leakage of a bellows in accordance with an embodiment. The method may be performed using the leakage tester 100 to test a bellows 200. As compared to the flowcharts of FIGS. 5 and 7, the method of FIG. 8 can incorporate elements of both the static mode test and the compress mode test. In block C1, the bellows 200 is retained in the bellows leakage tester 100 in an uncompressed position (e.g., FIGS. 3 and 4) and a compressed position (e.g., FIG. 6). The bellows includes a first opening and a second opening. The first and second openings are located at opposite ends of the bellows. The bellows further includes a first O-ring seal 208 proximate the first opening and a second O-ring seal 214 proximate the second opening. In block C2, an airtight space 216 is formed inside the bellows between the first O-ring seal and the second O-ring seal of the bellows. In block C3, a vacuum pressure is applied to the airtight space via the bellows leakage tester. In block C4, the bellows is tested for any air leakage in the compressed position and the uncompressed position. The testing procedures illustrated in FIG. 5 may be used to test the bellows in the uncompressed position, and the testing procedures illustrated in FIG. 7 may be used to test the bellows in the compressed position.

Figure 9:
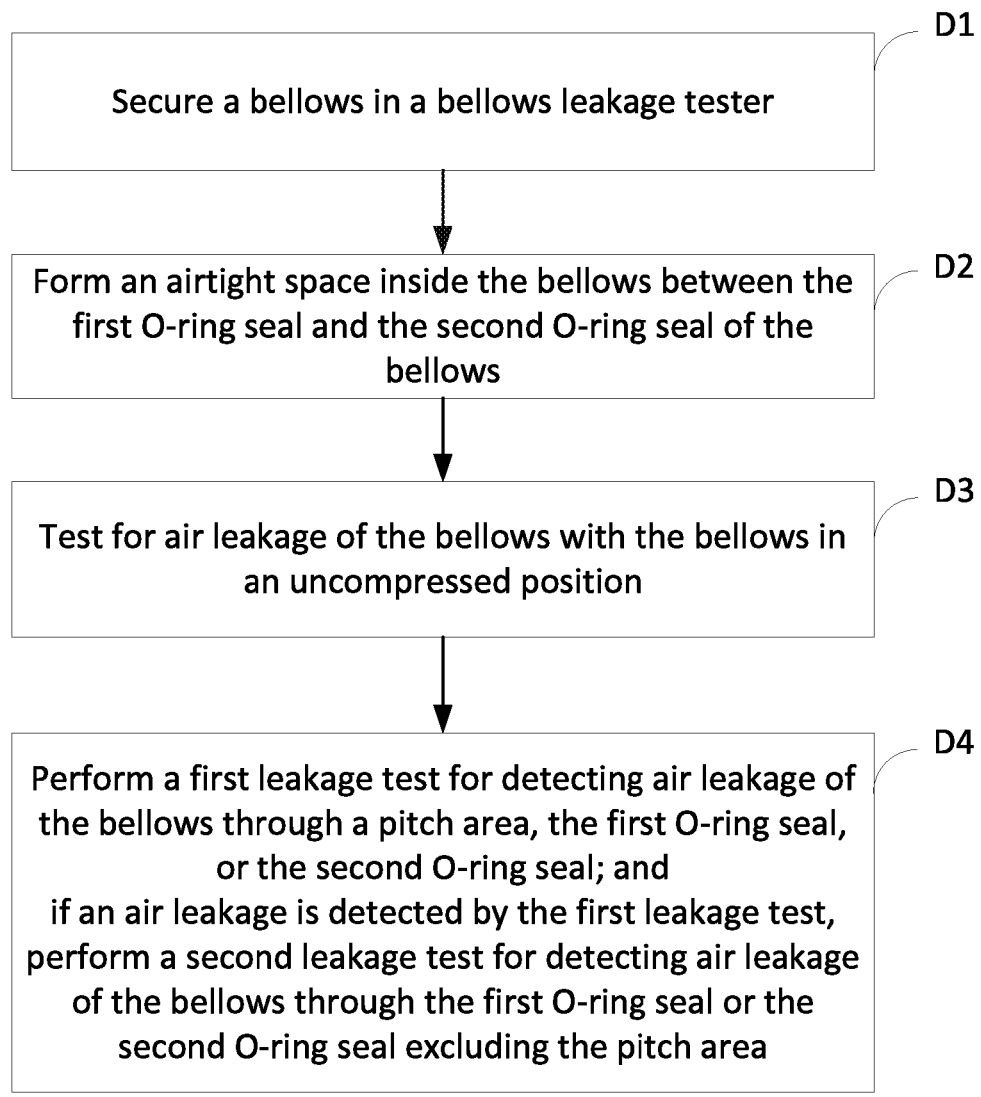
FIG. 9 is a flowchart illustrating a method for testing for air leakage of a bellows in accordance with an embodiment of the invention.

FIG. 9 is a flowchart illustrating a method for testing air leakage of a bellows in accordance with an embodiment. The method may be performed using the bellows leakage tester 100 to test a bellows 200. As compared to the method of FIG. 8, the method of FIG. 9 is slightly more focused on elements of the static mode test (e.g., the uncompressed position). As compared to the flowcharts of FIGS. 5 and 7, the method of FIG. 9 can incorporate elements of both the static mode test and the compress mode test. In block D1, the bellows 200 is secured in the bellows leakage tester 100. The bellows includes a first opening and a second opening. The first and second openings are positioned at opposite ends of the bellows. The bellows further includes a first O-ring seal 208 proximate the first opening and a second O-ring seal 214 proximate the second opening. In block D2, an airtight space is formed inside the bellows between the first O-ring seal and the second O-ring seal of the bellows. In block D3, the bellows 200 is tested for air leakage with the bellows in an uncompressed position (e.g., FIGS. 3 and 4). With the bellows in the uncompressed position, in block D4, a first leakage test is performed for detecting air leakage of the bellows through a pitch area, the first O-ring seal, or the second O-ring seal.

In one embodiment, the first leakage test may be performed according to the testing procedures described in blocks A1, A2, A3, and A4 of FIG. 5. If air leakage is detected in the first leakage test, a second leakage test is performed for detecting air leakage of the bellows through the first O-ring seal or the second O-ring seal, excluding the pitch area. In one embodiment, the second leakage test may be performed according to the testing procedures described in blocks A1, A2, A3 and A4 of FIG. 5. In some embodiments, if no air leakage of the bellows is detected with the first and second leakage tests, the bellows can be compressed and a third leakage test is performed for testing for air leakage of the bellows. In such case, the third leakage test can be performed according to the testing procedures described in FIG. 7.

In one embodiment, the processes of FIGS. 5, 7, 8, and 9 can perform the sequence of actions in a different order. In another embodiment, the processes can skip one or more of the actions. In other embodiments, one or more of the actions are performed simultaneously. In some embodiments, additional actions can be performed.

Figure 10A:
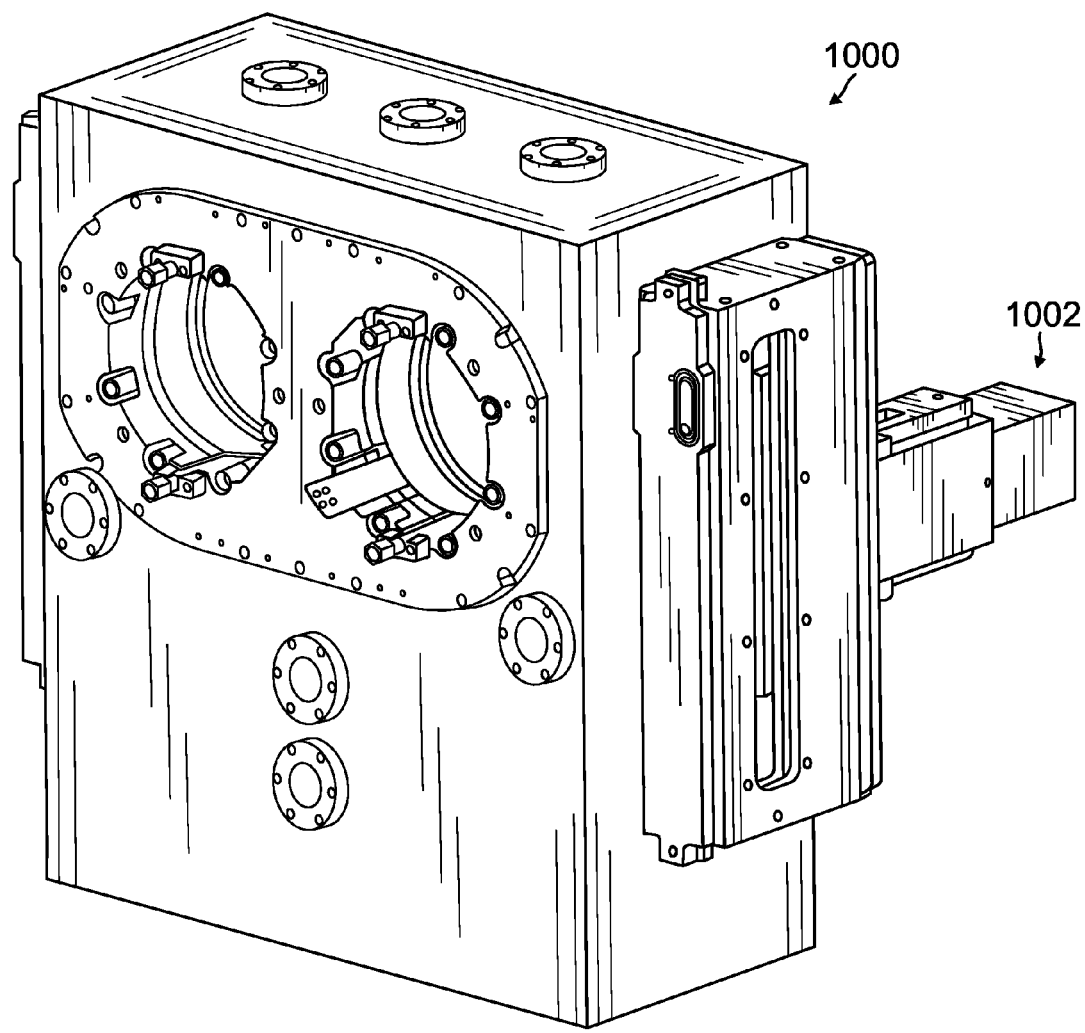
FIG. 10a is a schematic perspective view of a process chamber of a sputtering machine including a gate valve (GV) assembly.

FIG. 10a is a schematic perspective view of a process chamber 1000 of a sputtering machine including a GV assembly 1002. FIG. 10b is a schematic perspective view of the GV assembly 1002 including a bellows 1004. FIG. 10c is a schematic perspective view of the bellows 1004 illustrated in more detail. The bellows 1004 may be the same as the bellows 200 and may be tested for leakage using the leakage tester 100. The bellows 1004 may be an elastic metallic vessel that can be compressed when a compressive force (pressure) is applied in the axial direction of the bellows, or extended under a vacuum pressure. When the pressure is released, the bellows will return to its original shape.

While the above description contains many specific embodiments of the invention, these should not be construed as limitations on the scope of the invention, but rather as examples of specific embodiments thereof. Accordingly, the scope of the invention should be determined not by the embodiments illustrated, but by the appended claims and their equivalents.

The various features and processes described above may be used independently of one another, or may be combined in various ways. All possible combinations and sub-combinations are intended to fall within the scope of this disclosure. In addition, certain method, event, state or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other suitable manner. Tasks or events may be added to or removed from the disclosed example embodiments. The example systems and components described herein may be configured differently than described. For example, elements may be added to, removed from, or rearranged compared to the disclosed example embodiments.

What is claimed is:

1. An apparatus for testing air leakage of a bellows, comprising:
    a bellows comprising:
        a first opening and a second opening, wherein the first opening and second opening are positioned at opposite ends of the bellows;
        a first O-ring seal proximate the first opening; and
        a second O-ring seal proximate the second opening;
    a shaft configured to receive the bellows in an axial direction of the shaft, the shaft configured to pass through the first and second openings of the bellows, and the shaft having a portion configured to engage the first O-ring seal;
    a base having an opening on a first side for receiving an end portion of the shaft in the axial direction, the first side configured to engage the second O-ring seal, such that an airtight space is formed inside the bellows between the first O-ring seal and the second O-ring seal;
    an air leakage detector; and an air conduit extending through the base and configured to form an airtight connection between the airtight space and the air leakage detector, wherein the apparatus is configured to retain the bellows in either of an uncompressed position and a compressed position, and wherein the air leakage detector is configured to apply a vacuum pressure to the airtight space via the air conduit and thereby test the bellows for air leakage.

2. The apparatus of claim 1, wherein the shaft and the base are configured to change a volume of the airtight space by moving the shaft in the axial direction.

3. The apparatus of claim 1, further comprising:

a compression plate configured to engage the bellows such that the compression plate and the first side of the base are respectively in contact with the opposite ends of the bellows, wherein the compression plate and the first side of the base are configured to retain the bellows in the compressed position by applying compressive forces to the bellows in the axial direction.

4. The apparatus of claim 3, further comprising side plates extending from the base to the compression plate, wherein the compression plate is removably coupled with the side plates.

5. The apparatus of claim 4, further comprising a fastener for removably securing the compression plate with one of the side plates.

6. The apparatus of claim 1, further comprising a retaining shaft configured to retain the shaft in a selected axial position and be inserted through a hole of the base, wherein the shaft has at least two openings for receiving a portion of the retaining shaft such that the shaft is selectably fixed at a first position or a second position in the axial direction.

7. The apparatus of claim 1, further comprising a bellows cover configured to enclose in conjunction with the first side of the base a pitch area of the bellows, the bellows cover configured to act as an airtight barrier for the pitch area.

8. The apparatus of claim 7, wherein the bellows cover, the bellows, and the shaft are concentrically arranged with the shaft at substantially the center of the bellows.

* * * * *